United States Patent [19]
Hilton et al.

[11] Patent Number: 4,904,503
[45] Date of Patent: Feb. 27, 1990

[54] RAPID SETTING CEMENTITIOUS FIREPROOFING COMPOSITIONS AND METHOD OF SPRAY APPLYING SAME

[75] Inventors: Dennis M. Hilton, Londonderry, N.H.; Paul E. Korenberg, Carlisle; Suzanne M. Conroy, Arlington, both of Mass.

[73] Assignee: W. R. Grace & Co.-Conn., Lexington, Mass.

[21] Appl. No.: 102,171

[22] Filed: Sep. 29, 1987

[51] Int. Cl.⁴ .......................... B05D 3/02; B05D 1/02
[52] U.S. Cl. ................................ 427/373; 106/15.05; 106/114; 106/115; 106/315; 427/397.7; 427/427
[58] Field of Search ...................... 106/114, 115, 15.05, 106/314, 87; 427/426, 427, 397.7, 373

[56] References Cited

U.S. PATENT DOCUMENTS

| | | | |
|---|---|---|---|
| 1,844,662 | 2/1932 | King | 106/87 |
| 1,951,691 | 3/1934 | Coxon | 106/87 |
| 2,017,022 | 10/1935 | Roos | 106/88 |
| 2,216,555 | 10/1940 | King et al. | 106/315 |
| 2,364,344 | 12/1944 | Connell et al. | 106/86 |
| 3,035,940 | 5/1962 | Hobson | 427/426 |
| 3,719,513 | 3/1973 | Bragg et al. | 106/115 |
| 3,839,059 | 10/1974 | Rothfelder et al. | 106/115 |
| 3,929,692 | 12/1975 | Offerman | 106/115 |
| 4,306,395 | 12/1981 | Carpenter | 264/45.1 |
| 4,721,659 | 1/1988 | Tieckelmann | 427/403 |
| 4,751,024 | 6/1988 | Shu et al. | 252/601 |

OTHER PUBLICATIONS

"Essick Model TW-8 E-Z Coater Plaster and Finish Machine" Brochure, (undated), published by Essick Manufacturing Company.

"Essick Model TW-8 E-Z Coater" Brochure, (undated), published by Essick Manufacturing Company.

Primary Examiner—Theodore Morris
Attorney, Agent, or Firm—John J. Wasatonic; William L. Baker

[57] ABSTRACT

A method is provided whereby the setting time of a spray applied hydraulic cement-based fireproofing composition is decreased substantially while improving the yield of the composition. An acidic set accelerating agent is thus introduced into the composition effectively after conveyance through the system and in close proximity to the spray nozzle. At least about 0.5% of a basic material is provided which evolves a gas upon reaction with the accelerating agent. The invention also relates to the sprayable fireproofing compositions resulting from operation of the method.

15 Claims, 2 Drawing Sheets

RAPID SETTING CEMENTITIOUS FIREPROOFING COMPOSITIONS AND METHOD OF SPRAY APPLYING SAME

BACKGROUND OF THE INVENTION

This invention relates to rapid setting sprayable fireproofing compositions and to a method of spray applying the same to substrates which are to be fireproofed.

It is well known to spray apply hydraulic cement-based slurries to metal structural members in order to provide a heat resistant coating. A particularly successful type of product in this field is a gypsum-based formulation which contains, in addition to the gypsum binder, a lightweight inorganic aggregate, e.g., vermiculite, a fibrous substance, e.g. cellulose, and an air entraining agent. Such compositions are taught, for example, in U.S. Pat. Nos. 3,719,513 and 3,839,059. The slurries are generally prepared at ground level, pumped to the point of application, often exceeding 20 to 30 stories in high rise construction, and then applied through a spray nozzle.

In order to be suitable for such use, the slurries must possess a number of important properties. They must be able to hold a relatively large quantity of water such that they are sufficiently fluid to be pumped easily and to great heights. Yet they must retain a consistency sufficient to prevent segregation or settling of ingredients and provide an adequate "yield", or volume of applied fireproofing per weight of dry mix. The coating slurries, furthermore, must obviously adhere to steel surfaces, both in the slurried state and after setting. Also, the slurry must set without the undue expansion or shrinkage which could result in the formation of cracks that can deter from the insulative value of the coating.

A further factor which affects the formulation of the hydraulic cement-based compositions is set time. Fireproofing mixes, such as W. R. Grace & Co.'s MONO-KOTE - brand materials, are transported to the building site as dry mixtures and an appropriate amount of water is added to form a slurry. The slurry is pumped from temporary holding equipment to the point of application. The preparation and application processes span many hours and thus the setting time of the mix is generally heavily retarded to provide an acceptable field pot life.

Although the addition of retarders provides a mix which remains pumpable over many hours, this long set time is undesirable once the composition has been applied to the structure. The unset composition has a lesser degree of adhesion to the metal substrate and thus a greater tendency to fall off the substrate. If applied under hot, dry conditions, the mix may dehydrate before setting and yield a less than optimum final product. In cold temperatures, the mix may freeze before setting, while the preferred sequence is setting before freezing. Where multiple layers of fireproofing are to be applied, the first layer must set at least partially prior to application of the next layer. The long set time thus requires the sprayman to move on to another portion of the structure, only to return several hours later for application of the next layer. This results in an inefficient use of manpower.

SUMMARY OF THE INVENTION

This invention provides a spray application method and a sprayable fireproofing composition which eliminate the long setting times discussed above and, furthermore, provide an increase in the yield of the applied fireproofing composition. The method of the invention provides substantially decreased setting times while maintaining an acceptable pot life for purposes of conveyance through the application system. The method comprises the steps of conveying to a spray nozzle a slurry of a hydraulic cement-based fireproofing composition containing a set retarding agent and at least 0.5% by weight of a basic material, as defined hereinafter, introducing an acidic set accelerating agent into the slurry in close proximity to the nozzle, and then spray applying the slurry to the substrate which is to be fireproofed. The set accelerating agent may be introduced into the slurry by injecting it into a pressurized air stream which is used to effect atomization and spraying of the slurry onto the substrate.

In addition to decreasing the setting time, the acidic set accelerator also reacts with the basic material in the slurry. The basic material is one which, upon reaction with the accelerator, evolves a gas, e.g. carbon dioxide. This gas evolution has been found to occur to a sufficient extent, within the time constraint imposed by the accelerated setting time, to substantially expand or foam the composition and thereby provide a substantial increase in the yield of the slurry after setting. The reaction of the basic material and acidic accelerator also helps to raise the initial pH of the composition, thus decreasing any corrosive potential of the applied composition on the metal substrate.

The present invention also relates in part to the fireproofing compositions resulting from operation of the method. The compositions accordingly comprise a hydraulic cement binder, an acidic set accelerating agent, and at least 0.5% by weight of a basic material which is capable of generating a gas when reacted with the accelerating agent.

DETAILED DESCRIPTION OF THE INVENTION

Figure 1:
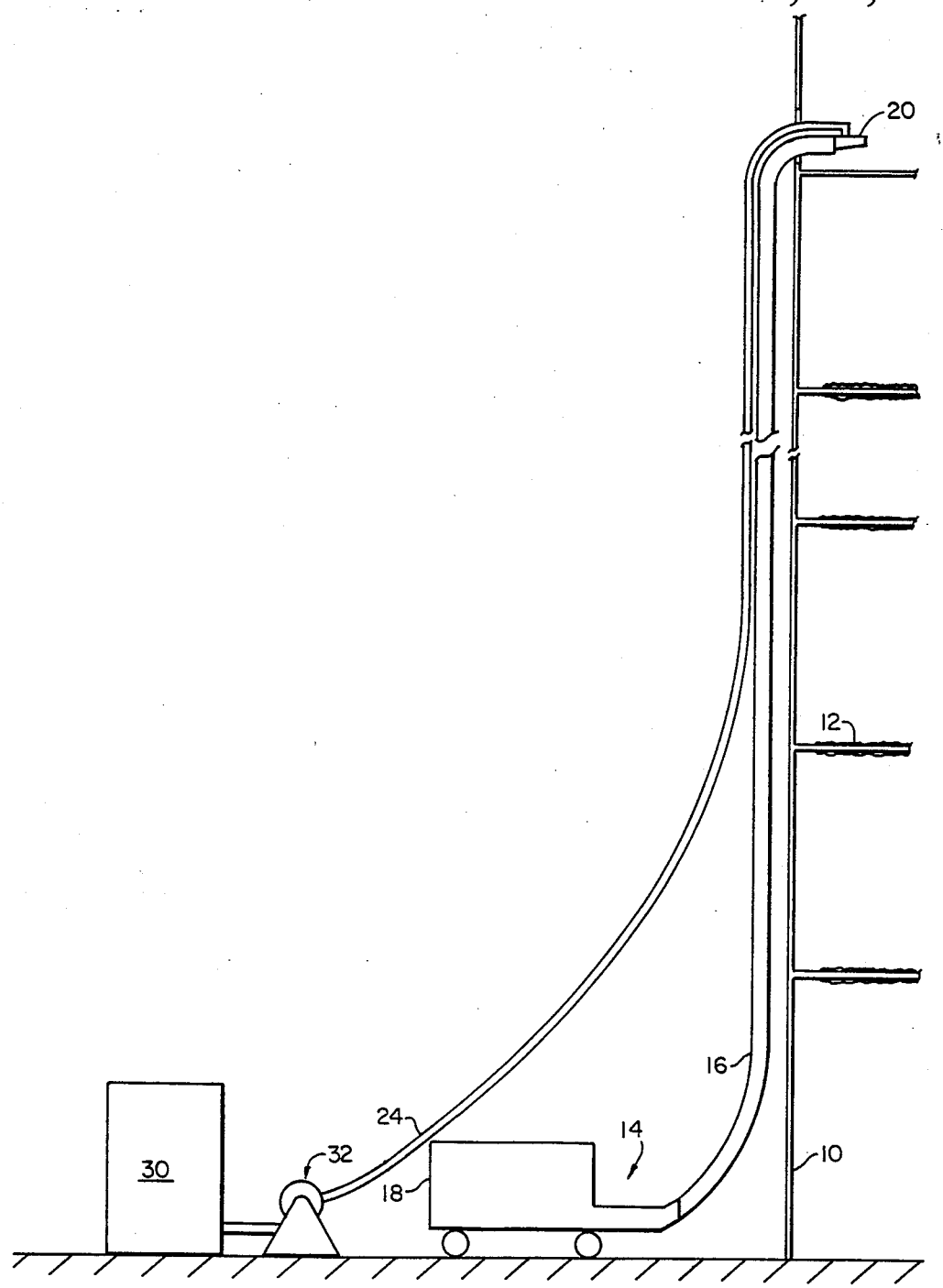
FIG. 1 is a diagrammatic view of a fireproofing application system according to the present invention.

As used herein, the term "hydraulic cement-based fireproofing composition" means a composition which comprises a hydraulic cement binder and which, in slurry form, can be applied to a metal structural member and provide insulative protection against fire and heat. The protection of the metal structural member is usually manifested under high heat conditions by a substantial decrease in the tendency of the metal to buckle or warp.

The term "yield" means the volume of applied fireproofing composition after setting per given weight of dry mix used to prepare the fireproofing composition slurry.

The term "basic material" refers to any material which reacts with the acidic set accelerating agent used in the compositions or method of this invention with resultant evolution of a gas and volume expansion of the fireproofing slurry. The term "added basic material" refers to a basic material which is added to the fireproofing composition and is not naturally occurring in the hydraulic cement binder.

Unless otherwise indicated, all percentages and proportions given herein are by weight, based on the total weight of dry mix used to prepare the fireproofing slurry.

As indicated above, the method of this invention involves the introduction of an acidic set accelerating agent into the fireproofing slurry in close proximity to the spray nozzle. Thus, the accelerator is introduced sufficiently close to the spray nozzle that the desired, retarded setting time for holding and pumping the slurry is not changed. With this process, the introduction of the accelerator, the mixing of same with the slurry, and spray application occur in rapid succession. It has been found, however, that within the time constraints of this sequence the accelerator can be rapidly and uniformly mixed into the slurry and that a substantial acceleration of the setting time of the applied slurry is achieved despite the heavy concentration of retarder therein. It has also been found that, within the time constraint of this sequence and the additional constraint imposed by the accelerated set time, the accelerator can react with the basic material in the slurry to a sufficient extent to provide substantial yield increases. Thus, although the slurry is caused to set rapidly, the accelerator and basic material react sufficiently, prior to setting, to effect a volume expansion of the slurry and thus provide a substantial increase in yield.

The introduction of the accelerator close to the nozzle minimizes the potential for hardening of the accelerated mix in the feed line during pumping and, moreover, facilitates easy clean out of the line should the pumping process be interrupted and such hardening occur. Thus, should the spraying process be interrupted, only a very small portion of the mix at the head of the line can harden and this is easily removed. From this standpoint, it is preferred to introduce the accelerator as close as possible to the nozzle opening. This preference is balanced, however, by the need to obtain satisfactory mixing of the accelerator and slurry. The compatibility of the accelerator and slurry and the efficiency of the mixing process are thus factors in determining the particular point at which the accelerator is introduced. With highly efficient mixing, as where the accelerator is mixed with atomizing air used for spraying, the accelerator may be introduced immediately adjacent to the nozzle opening, as shown, for example, in FIG. 2. The accelerator may be introduced at a more remote point, however, in order to accommodate less efficient mixing. The approximate distance from the nozzle opening at which the accelerator is introduced may be as much as, for example, two feet, but preferably is less than about six inches.

The accelerator is generally introduced into the slurry in a fluid state, either by use of a liquid accelerator or as a solution of a solid accelerator material. The accelerator fluid may be injected into a pressurized air stream which is used to atomize and spray the fireproofing slurry. This method effectively provides a mist of the accelerator fluid and introduces the mist into the slurry with a high level of force. It has been found that this method of introduction provides a rapid and uniform distribution of accelerator in the slurry and thus affords uniform setting of the coating on the substrate surface. Atomizing air pressures in the range of about 5 psi to 100 psi are normally used.

Figure 2:
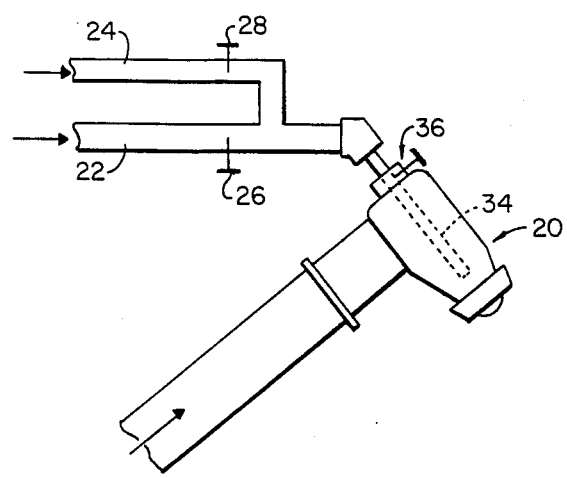
FIG. 2 is a diagrammatic view of a spray nozzle which may be used with the system depicted in FIG. 1.

This preferred system is illustrated in the FIGS. 1 and 2. In FIG. 1, a steel framework is designated 10 and includes a plurality of floors, several of which have been treated with one or more layers of fireproofing composition 12. A pumping system is provided which includes a plaster pump 14 and associated fireproofing supply line 16. A reservoir 18 is provided within which the dry fireproofing composition and an appropriate volume of water are mixed to form a slurry. The slurry is pumped by plaster pump 14 through supply line 16 to spray nozzle 20 shown in greater detail in FIG. 2. The slurry is broken-up at nozzle 20 by a stream of pressurized air which is supplied via air line 22. The set accelerating additive is injected into the air supply via line 24 upstream of nozzle 20. A valve 26 is used to control the air flow. A second valve 28 is provided to control the accelerator flow. Referring again to FIG. 1, a storage tank 30 containing a aqueous solution of the accelerator is provided. The accelerator solution is pumped by pump 32 through line 24 to nozzle 20.

As the accelerator solution meets the air stream in line 22 it is separated into droplets and the resultant mist is injected into the slurry through air stem 34 just prior to the slurry exiting from the spray nozzle. Air stem 34 is movable within nozzle 20, allowing adjustment of the distance between the end of the air stem and the nozzle opening. A set screw 36 is used to fix the position at the air stem. As shown in FIG. 2, the end of the air stem may be closely positioned to the nozzle opening such that the contact time of the accelerator and slurry prior to spraying is exceedingly short. However, the introduction of the accelerator in the form of a mist under the relatively high force of the pressurized air is sufficient to provide efficient mixing and rapid attainment of a uniform distribution of the accelerator in the slurry. Uniform setting throughout the applied layer is thus obtained, as well as optimization of the yield and the improved physical properties discussed below.

Any acidic reacting set accelerating agent capable of satisfactorily offsetting the retardation of the slurry and reacting sufficiently fast with the basic material can be used in this invention. For most commercial applications, the type and amount of accelerator is such as to rapidly convert the setting time from about 4 to 12 hours to less than about 15 minutes. It is usually preferred to employ a accelerator in an amount which results in a setting time of about 5 to 10 minutes. The amount required to provide such setting times will vary depending on the accelerator and the type and amount of retarder, binder, and basic material. Generally, an amount in the range of about 0.1% to 20% by weight is used. In the case of typical gypsum based compositions, about 0.5% to 10.0% is usually preferred.

Included among the acidic accelerators which can be used in this invention are aluminum sulfate, aluminum nitrate, ferric nitrate, ferric sulfate, ferric chloride, ferrous sulfate, potassium sulfate, sulfuric acid, and acetic acid. Aluminum sulfate is a preferred accelerator.

The gas evolution resulting from reaction of the acidic accelerator and basic material has been found to cause expansion of the fireproofing mixture in the relatively short time prior to setting of the composition. Sufficient expansion can occur to cause significant increases in the yield of the set composition. Yield increases in the range of about 5% to 30% have been observed, for example, in gypsum-based compositions.

In offsetting the set retardation of the slurry, acidic accelerator is generally consumed, and thus unavailable for reaction with the basic material. The accelerator is thus added in sufficient excess to provide material for reaction with the basic material. Accelerator concentrations in the aforementioned range of about 0.1% to 20% will generally provide the desired excess. With gypsum-based compositions, amounts in the range of about 0.5% to 10.0% are generally useful. The optimal amount of accelerator is normally determined empirically.

As aforementioned, accelerators which are normally liquids can be introduced as such into the slurry. Typically, however, the accelerator is a normally solid material which is dissolved in an appropriate solvent, preferably water, and the solution is introduced into the slurry. The acidic accelerators mentioned above are of advantage in this regard, most of these being capable of dissolution in water in desired concentrations. In general, concentrations in the range of about 10% to 50% by weight, based on the weight of the solution, are used.

The basic material which reacts with the acidic accelerator can be a carbonate, bicarbonate, or other basic material capable of evolving a gas, usually carbon dioxide, upon reaction with an acid. The basic material should react sufficiently fast with the accelerator to cause the desired degree of gas evolution and volume expansion prior to setting of the slurry. Compounds which can be used as the basic material include calcium carbonate, sodium carbonate, and sodium bicarbonate.

In accordance with this invention, at least about 0.5% by weight of basic material is employed in the slurry. In general, an amount in the range of about 2% to 25% by weight is preferred. It is even more preferred to have at least about 4% by weight of basic material and a more preferred range is about 4% to 20%. The basic material may be provided as a naturally occurring material in the cementitious binder, such as naturally occurring calcium carbonate in gypsum, or added basic material may be used. The amount of added basic material will vary depending on the amount of naturally occurring basic material in the binder. Generally, the amount added is in the range of about 0.1 to 10 percent, and more typically in the range of about 0.5 to 5 percent.

In addition to providing a yield increase, the reaction of the basic material accelerates neutralization of the slurry, offsetting the lower pH imparted by the acidic accelerator and thus decreasing any corrosive potential of the applied composition on the metal substrate. This is particularly beneficial in gypsum-based compositions, wherein the acidic accelerator has a greater tendency to affect the pH than, for example, in the more basic Portland cement-based compositions. Typically, the total amount of basic material, i.e., naturally occurring material plus any added amounts, is such that the final pH of the set composition is greater than about 6.5.

The density of the set fireproofing composition, which influences its strength and fireproofing characteristics, is preferably greater than about 12 pounds per cubic foot (pcf) and generally is in the range of about 12 to 25 pcf. A more preferred minimum density limit is about 15 pcf. Since the aforementioned gas evolution causes a decrease in the density of the set composition, the total amount of acidic accelerator and basic material in the fireproofing composition is effectively limited to that which will provide at least the minimum required density.

The fireproofing compositions which are prepared for conveyance in accordance with the method of the invention contain a set retarder. Generally, a strong retarder is used in sufficient amount to provide a setting time in the range of 4–12 hours. The composition is thus adapted for preparation and use in typical commercial applications, wherein it is prepared in large volume and spray applied over several hours. The retarder may be added at the job site but is generally present in the dry hydraulic cement mix used to prepare the slurry.

The hydraulic cement binder can be any of those previously known for use in fireproofing compositions, e.g., gypsum, Portland cement, aluminous cement, or pozzolanic cement. It is generally preferred to use gypsum due to its advantageous fireproofing characteristics. (As used herein, the term "gypsum" includes Plaster of Paris (non-hydrated) as present, for example, in the dry mix prior to water addition, as well as gypsum, per se (hydrated Plaster of Paris). The binder can be used in relatively low amounts, e.g., as little as 40% by weight, but generally is present in an amount of at least about 55% by weight, and more preferably at least about 60% by weight.

The composition may also contain other additives and ingredients previously known in the art, e.g., air entraining agents, fibrous materials, and aggregate materials. A preferred composition for use in the invention comprises a gypsum binder, lightweight aggregate, an air entraining agent, and a fibrous component. The lightweight aggregate can be, e.g., expanded or unexpanded vermiculite, perlite, glass beads, or shredded polystyrene. Although the amount of aggregate can vary within wide limits, depending on the density of the aggregate, other materials present in the composition, and desired physical properties, it may be present in an amount of as little as 1% to as much as 50%.

In general, the method of this invention provides improved properties in fireproofing compositions regardless of the aggregate material. However, the method has been found to be especially advantageous for use with compositions containing shredded polystyrene aggregate. Especially beneficial increases in yield and adhesion to the metal substrate are obtained in such compositions by use of the present method.

The shredded polystyrene aggregate can be produced by shredding loose expanded polystyrene beads, molded polystyrene beadboard, or extruded polystyrene. A method and apparatus for shredding foamed polystyrene beads are disclosed in U.S. Pat. Nos. 3,627,211 and 3,686,068, the disclosure of which is expressly incorporated by reference herein. As disclosed in these patents, the shredded particles have irregularly shaped exterior surfaces, tears, and ragged edges. The shredding process opens a substantial number of the cells on the surface of the foamed beads, thereby allowing penetration of the cementitious binder into the cellular structure and providing a more intergral mix between the binder and the particle.

It is known to shred foam particles and mix the shredded particles with a granulate slurry wherein the granular material may comprise cement particles, sand, gypsum particles and the like. As disclosed, for example, in U. S. Pat. Nos. 3,630,820 and 4,100,242, if a sufficient number of the cells are penetrated by the slurry, the buoyancy of the particles becomes decreased such that the high viscosity of the slurry prevents the particles from rising.

The shredded polystyrene particles are preferably employed in a weight concentration of about 1% to about 5%. These concentrations are preferred for providing pumpable, non-segregating, uniform slurries which provide excellent fire protection. The density of the shredded polystyrene is preferably in the range of about 0.2 to 0.6 pounds per cubic foot, more preferably about 0.3 to 0.5 pcf. Preferably, the particle size at its maximum dimension is less than ¼ inch.

It is generally preferred to employ a gypsum binder in conjunction with the shredded polystyrene aggregate. Although the gypsum can be used in relatively low amounts, e.g., as little as 60% by weight, it is generally preferred to employ a least 75% by weight, based on the total weight of the composition, and more preferably at least about 85% by weight.

The fibrous component of the fireproofing compositions can be either organic or inorganic. Preferably, the fibrous component is a mixture of a high wet bulking organic fiber, preferably cellulose fiber as described in U.S. Pat. Nos. 3,719,513 and 3,839,059, and an inorganic fiber which provides reinforcement, preferably glass fiber. The total amount of the fibrous component in the composition is preferably in the range of about 4% to 20% by weight. A particularly preferred composition comprises about 2% to 10% by weight of high wet bulking cellulosic fiber and about 0.1% to 2% by weight of glass fiber. It has been found that these particularly preferred fiber loadings provide an optimum composition for easy pumping without segregation and for placement in high yield.

The foaming agents or air entraining agents that can be used in the compositions of the invention are well known in the art. Such well known materials as sulfonated monoglycerides, sodium alkyl arylsulfonate, sodium laurel sulfate and sodium α-olefin sulfonates can be used in appropriate quantities to provide a slurry of desired density and pumpability. Dry foaming agents can be incorporated into the dry composition before addition of water, while both dry and liquid agents can be added to the slurried composition. Preferred amounts of the air entraining agent are about 0.1% to 0.5% by weight.

In addition to the set acceleration and yield increase discussed above, the method of this invention provides several other advantages:

1. The rapid setting permits multiple layers to be applied in short succession, thus providing substantially increased efficiency in the application process.
2. There is a significantly lessened tendency for the composition to fall off the substrate. This may allow the use of more water in preparing the mix, thus providing additional yield increases. In addition, in certain applications thicker layers can be applied, reducing or eliminating the need for multiple layers.
3. The set compositions have been found to have a higher strength and abrasion resistance at comparable density than the non-accelerated set compositions.
4. Higher thermal efficiency may be obtained for a given density in the set composition.
5. The rapid setting or yield increase afforded by the present method may allow greater flexibility in the type and amount of other ingredients in the mix. As one example, the yield or adhesion of compositions containing shredded polystyrene aggregate may not be entirely satisfactory in certain applications. The increases in yield and adhesion provided by the present method can accordingly provide for a more satisfactory utilization of this particular aggregate.

The present invention is further described in the following Examples, which are illustrative only and not intended to be of limiting effect.

EXAMPLE 1

A pumpable, gypsum-based fireproofing composition was prepared by dry mixing the following ingredients:

| Ingredient | % by Weight |
| --- | --- |
| Gypsum | 89.8 |
| Shredded expanded polystyrene (density of 0.8 lbs/ft$^3$) | 2.7 |
| Cellulose fiber | 6.7 |
| Glass fiber | 0.5 |
| Air entraining agent | 0.2 |

The gypsum used in the mix contained a strong proteinaceous set retarder and more than 1% of calcium carbonate. The dry composition was mixed with water at a water:dry mix ratio of 1.4:1, providing a slurry with a setting time of about eight hours.

The slurry was pumped at a rate of about 150 ft$^3$/hr. to a spray nozzle equipped with a pressurized air inlet. A pressurized air line was connected to the inlet. Grafted into this line, at a point about 15 feet from the nozzle, was an accelerator feed line. A 30% solids aqueous solution of aluminum sulfate (alum) was pumped through this feed line and introduced into the air stream. The resultant air/accelerator mixture was then introduced into the slurry through the air inlet to effect atomization and spraying of the slurry. The rate of flow of the alum solution was varied to provide a concentration of 0.75% to 1.25% alum. This rate of alum addition resulted in set times of approximately 7 to 9 minutes.

The slurry was sprayed onto steel I-beams to a thickness of about ¾ inch. The entire coating remained fully adhered to the substrate, whereas sections of prior ¾ inch coatings of the composition without alum had occasionally fallen off the substrate. The coating thickness was then increased to 1 ½ inches without any fall-off occurring. When the alum injection was stopped, large sections of the 1 ½ inch coating fell off the substrate.

The dry density of the alum accelerated composition was 23.6 pounds per cubic foot (pcf), as compared to a density of 25.2 pcf for the composition without alum. A 7.4% yield increase was obtained by alum injection. Thus, the yield of the set and dried composition containing alum was 0.58 board feet per pound of dry mix (bd.ft./lb.) as compared to 0.54 bd.ft./lb. for the composition without alum.

In a further test, the water:dry mix ratio was increased to 1.6 and the composition sprayed to a thickness in excess of 1 inch. The applied composition, containing alum at the concentrations given above, remained fully adhered. When the alum addition was stopped, large sections of the applied fireproofing fell off the steel. The density at the higher water:gypsum ratio was 22.4 pcf and a further yield increase to 0.6 bd.ft./lb. was obtained.

EXAMPLE 2

A test series was conducted using a set-retarded, pumpable slurry prepared from a dry mix as described in Example 1 and varying levels of alum with and without calcium carbonate being added to the dry mix. The alum was introduced into the fireproofing slurry with the atomizing air and sprayed onto a steel substrate. Set time, density, and yield were determined and are presented in Table 1. Set time was determined by monitoring the temperature of the mix and determining the point at which a sharp increase in temperature occurred, evidencing crystallization and setting of the gypsum.

TABLE 1

| Alum Concentration | Added CaCO3 Concentration | Set Time (hr:min) | Dry Density (pcf) | Yield (bd. ft./lb) |
|---|---|---|---|---|
| — | — | 8:02 | 24.5 | 0.57 |
| 1.25% | — | 0:13 | 20.9 | 0.67 |
| 2.00% | — | 0:11 | 20.8 | 0.67 |
| — | 2.00 | — | 24.7 | 0.56 |
| 1.25% | 2.00 | 0:13 | 19.5 | 0.72 |
| 2.00% | 2.00 | 0:10 | 19.6 | 0.71 |

The results in Table 1 illustrates the increased yield obtained by the use of added calcium carbonate. The accelerated setting time was unaffected by the added calcium carbonate.

EXAMPLE 3

The level of addition of alum and calcium carbonate to a pumpable slurry prepared from a dry mix as described in Example 1 was varied to determine the effect on pH. The pH was determined immediately after alum addition ("initial" pH) and at 24 and 72 hours after alum addition. The experimental results are presented in Table 2.

TABLE 2

| Alum Concentration | Added CaCO3 Concentration | pH Initial | 24 hours | 72 hours |
|---|---|---|---|---|
| — | — | 7.82 | 7.17 | 7.43 |
| 1.25% | — | 4.44 | 6.63 | 7.26 |
| 1.25% | 1.00% | 5.19 | 6.39 | 7.24 |
| 1.25% | 2.00% | 4.65 | 6.63 | 7.31 |
| 1.25% | 5.00% | 5.35 | 6.60 | 7.37 |
| 2.00% | — | 4.08 | 5.29 | 5.01 |
| 2.00% | 1.00% | 4.10 | 6.07 | 7.04 |
| 2.00% | 2.00% | 4.22 | 6.44 | 7.15 |
| 2.00% | 5.00% | 4.80 | 6.65 | 7.23 |

The results of Table 2 show that added calcium carbonate can accelerate the rate of pH increase and provide a higher final pH. The addition of calcium carbonate is especially beneficial at the higher alum concentration.

EXAMPLE 4

A pumpable fireproofing slurry was prepared using a dry mix as described in Example 1. Alum and calcium carbonate were added to the slurry at the concentrations shown in Table 3. The water:gypsum ratio and atomizing air pressure used to spray the slurry were varied as shown in Table 3 to provide relative "high" and "low" densities for each type of composition. The calcium carbonate was added to the dry mix prior to water addition. The alum was introduced into the atomizing air stream and injected into the slurry at the spray nozzle in a manner similar to that described in Example 1. The respective compositions were sprayed onto hot rolled steel plate, allowed to set and then dry at room temperature for four days, and further dried in an oven at 120° F. for 24 hours.

The coatings were then tested for abrasion resistance, hardness, and bond strength. Abrasion resistance was measured using a Gardner paint abrasion tester for 125 cycles. The amount in grams lost from each coating is presented in Table 4. Hardness was determined using a Soil Test Inc. CT-421 penetrometer to a penetration depth of ¼ inch. The results of hardness measurement in pounds per square inch are are also presented in Table 4. The bond strength was determined by cutting 2 ½ inch diameter discs of the coated plate, adhering similarly sized wooden discs to the top and bottom (fireproofing and metal) surfaces of the disc with epoxy adhesive, attaching the wooden discs in an Instron machine, and measuring the force required for adhesive or cohesive failure of the fireproofing. (In general, a combination of adhesive and cohesive failure was observed.) The bond strength (force) measurements, in pounds per square foot, are also presented in Table 4.

TABLE 3

| Comp. | Alum Conc. | Added CaCO3 Conc. | Water:Gypsum Ratio | Air Pressure (psi) | Density (pcf) |
|---|---|---|---|---|---|
| A | — | — | 1.65 | 10 | 19.6 |
| B | — | — | 1.50 | 30 | 22.4 |
| C | 1.2 | — | 1.65 | 10 | 18.8 |
| D | 1.2 | — | 1.50 | 30 | 21.3 |
| E | 1.2 | 5.0 | 1.65 | 10 | 18.0 |
| F | 1.2 | 5.0 | 1.50 | 30 | 19.7 |

TABLE 4

| Comp. | Abrasion Resistance (grams lost) | Hardness (psi) | Bond Strength (psf) |
|---|---|---|---|
| A | 9.8 | 245 | 957 |
| B | 6.5 | 330 | 1078 |
| C | 1.5 | 385 | 1360 |
| D | 0.6 | 540 | 1862 |
| E | 1.3 | 305 | 1159 |
| F | 1.0 | 450 | 1371 |

EXAMPLE 5

A pumpable fireproofing composition was prepared by dry mixing the following ingredients:

| Ingredient | % by Weight |
|---|---|
| Gypsum | 68.4 |
| Expanded vermiculite | 26.3 |
| Cellulose fiber | 4.8 |
| Glass fiber | 0.4 |
| Air entraining agent | 0.1 |

The gypsum used in the mix contained a strong proteinaceous set retarder and approximately 6.5% of calcium carbonate. The dry composition was mixed with water at a water:dry mix ratio of 1.9 : 1. The slurry was pumped to a spray nozzle of the type described in Example 1. A 40% solids aqueous solution of alum was introduced into the atomizing air feed line at a point about 2 feet upstream of the nozzle. The air/accelerator mixture was then used to effect spraying as in Example 1. The rate of flow of the alum solution was modulated to provide an alum concentration in the slurry of about 1.8%, providing a setting time of approximately 8 to 10 minutes.

The slurry was sprayed on steel I-beams to a total thickness of about 2 inches using three passes at about 10 minute intervals. For comparison, a part of the spraying operation was carried out without alum injection. About 25 samples of each composition, with and without alum, were taken from various spraying locations over a period of days, dried in laboratory ovens at about 120° F., and used for density and yield measurements.

The average density of the composition without alum was 22.8 pcf while the alum accelerated composition had an average density of 19.9 pcf. The average yield of the alum accelerated fireproofing was 0.66 bd.ft./lb as compared to 0.58 bd.ft./lb. for the fireproofing samples without alum.

What is claimed is:

1. A method comprising the steps of: conveying to a spray nozzle a slurry of a hydraulic cement-based fireproofing composition consisting essentially of a hydraulic cement binder selected from the group consisting of Plaster of Paris, gypsum, Portland cement, aluminous cement, and possolanic cement, a set retarding agent and at least about 0.5% of a basic material;
   introducing an acidic set accelerating agent into said slurry in close proximity to said nozzle; and
   spraying said slurry onto a substrate;
   wherein (a) the setting of said slurry is accelerated and (b) said basic material and set accelerating agent react prior to the accelerated setting of said slurry to provide a yield increase therein and a density after the composition has set in the range of about 12 to 25 pounds per cubic foot.

2. A method of claim 1 further comprising introducing pressurized air into said slurry to effect atomization and spraying thereof.

3. A method of claim 2 wherein said pressurized air contains said set accelerating agent.

4. A method of claim 1 wherein said set accelerating agent is introduced into said slurry as a liquid or in solution and is atomized to a mist prior to introduction into said slurry.

5. A method of claim 1 wherein said set accelerating agent is introduced into said slurry in an amount which reduces the setting time thereof to less than about 15 minutes.

6. A method of claim 1 wherein said set accelerating agent is aluminum sulfate.

7. A method of claim 1 wherein said set accelerating agent is introduced into said slurry at a rate providing a concentration of said set accelerating agent of about 0.1% to 20%.

8. A method of claim 1 wherein said fireproofing composition comprises about 2% to 25% of said basic material.

9. A method of claim 1 wherein said binder is gypsum and said basic material is a carbonate or a bicarbonate.

10. A method of claim 1 wherein said basic material is selected from the group consisting of calcium carbonate, sodium carbonate, or sodium bicarbonate.

11. A method of claim 1 wherein said composition contains an added basic material.

12. A method of claim 11 wherein said composition contains about 0.1 to 10 percent of said added basic material.

13. A method of claim 11 wherein said added basic material is selected from the group consisting of calcium carbonate, sodium carbonate and sodium bicarbonate.

14. A method of claim 1 wherein said yield is increased about 5% to 30%.

15. A method of claim 1 where said slurry further contains shredded polystyrene aggregate.

* * * * *